US008028240B2

(12) United States Patent
Stephen et al.

(10) Patent No.: US 8,028,240 B2
(45) Date of Patent: Sep. 27, 2011

(54) CUSTOM LABELER FOR SCREEN READERS (75) Inventors: Joseph Stephen, St. Petersburg, FL (US); Eric Damery, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 366 days.

(21) Appl. No.: 11/306,013

(22) Filed: Dec. 14, 2005

(65) Prior Publication Data

US 2006/0200757 A1 Sep. 7, 2006

Related U.S. Application Data (60) Provisional application No. 60/593,133, filed on Dec. 14, 2004.

(51) Int. Cl.
*G06F 17/00* (2006.01)

(52) U.S. Cl. ......... 715/763; 715/236; 715/277; 715/513

(58) Field of Classification Search .................. 715/513, 715/763, 865, 236, 277; 704/270, 260
See application file for complete search history.

(56) References Cited

U.S. PATENT DOCUMENTS

| 5,401,110 | A  | * | 3/1995  | Neeley          | 400/621 |
| 6,289,312 | B1 |   | 9/2001  | Raman           |         |
| 6,546,431 | B1 | * | 4/2003  | Brown et al.    | 719/313 |
| 6,697,781 | B1 |   | 2/2004  | Sahlberg        |         |
| 6,889,337 | B1 | * | 5/2005  | Yee             | 714/1   |
| 6,961,944 | B2 |   | 11/2005 | Chew et al.     |         |
| 7,194,411 | B2 | * | 3/2007  | Slotznick et al. | 704/271 |
| 7,216,292 | B1 | * | 5/2007  | Snapper et al.  | 715/236 |
| 2002/0115051 | A1 | * | 8/2002  | Sanda           | 434/350 |
| 2002/0178007 | A1 | * | 11/2002 | Slotznick et al. | 704/270.1 |
| 2003/0122869 | A1 | * | 7/2003  | Aggarwal et al. | 345/760 |
| 2003/0200093 | A1 | * | 10/2003 | Lewis et al.    | 704/260 |
| 2005/0022108 | A1 | * | 1/2005  | Carro et al.    | 715/500 |
| 2005/0022115 | A1 | * | 1/2005  | Baumgartner et al. | 715/513 |
| 2005/0034063 | A1 | * | 2/2005  | Baker et al.    | 715/513 |
| 2005/0055643 | A1 | * | 3/2005  | Quimby          | 715/763 |
| 2005/0210030 | A1 |   | 9/2005  | Gordon et al.   |         |

* cited by examiner

*Primary Examiner* — William L Bashore
*Assistant Examiner* — Meseker Takele
(74) *Attorney, Agent, or Firm* — Anton J. Hopen; Smith & Hopen, P.A.

(57) ABSTRACT

A screen reader feature is described that enables end users to assign their own descriptions to forms and navigational elements in electronic documents such as web pages, word processing documents and portable document formats. The form or navigational element is identified by the end user. A dialog box provides a text entry box for accepting a user-defined description. The description is saved in association with the document and its particular form or navigational element.

24 Claims, 6 Drawing Sheets www.google.com.JSI - Notepad

File  Edit  Format  View  Help

```
[CustomLabels]
q=search for:
```

CUSTOM LABELER FOR SCREEN READERS

CROSS-REFERENCE TO RELATED APPLICATION

This application claims priority to U.S. Provisional Patent Application No. 60/593,133, filed Dec. 14, 2004, the contents of which are herein incorporated by reference.

FIELD OF INVENTION

This invention relates to screen reader applications for computer systems. More particularly this invention relates a screen reader feature for assigning user-defined descriptions to form input elements and navigational elements in a computer-rendered document.

BACKGROUND OF THE INVENTION

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

Screen readers are devices that interpret display output typically viewed on a computer monitor and cause a voice synthesizer, Braille reader or other alternative device to output the same content. A well known screen reader is JAWS® available through Freedom Scientific, Inc. (St. Petersburg, Fla.). Screen readers are particularly useful for a blind or low vision user. One such screen reader is JAWS® for Windows. When installed upon a personal computer, JAWS® provides access to the operating system, software applications and the Internet. JAWS® includes a speech synthesizer that cooperates with the sound card in the personal computer to read aloud information appearing upon the computer monitor screen or that is derived through communicating directly with the application or operating system. Thus, JAWS® provides access to a wide variety of information, education and job related applications. Additionally, JAWS® includes an interface that can provide output to refreshable Braille displays. Current JAWS® software supports all standard Windows® applications, including Microsoft Office XP®. JAWS® supports Internet Explorer with special features, such as, links lists, frame lists, forms mode and reading of HTML labels and graphic labels included on web pages. Upon entering an HTML document via an Internet link, JAWS® actuates a Virtual PC Cursor that mimics the functions of the PC cursor. The Virtual PC cursor causes JAWS® to signal the speech synthesizer to speak the number of frames in a document being read in Internet Explorer and the number of links in the frame currently being displayed. Also, JAWS® causes the speech synthesizer to read graphics labeled by alternate tags in HTML code.

A problem arises when certain form fields and navigational items do not contain a minimum requisite of information for the screen reader to interpret the content. For example, a form field in a web page might accept typed input for searching a directory of other websites. Alternatively, graphic images may be used as navigational links to move from one website to another. A sighted user has little difficulty in interpreting these elements as they are presented on the web page. A typical sighted user, or "typical user", can make a cursory scan of the window of data until he or she arrives at the desired information. The visual presentation and context often supply a certain amount of information that is useful to such a typical user. In contrast, such information is ineffectively presented using standard screen readers relying on the information and tools supplied by the author of the web page or other electronic document. As a consequence, visually impaired users are at a disadvantage when trying to utilize such a computer-rendered document.

While there are usually means to associate the forms and links with descriptive information for low-vision or blind users, authors may not include appropriate descriptions or even be aware of the need for such information. Furthermore, even if authors do include appropriate descriptive information about such screen elements, the low-vision or blind user may wish to customize the description to suit his or her needs. Different users have different needs for information. Where the user may be vision-impaired or blind, the need to interface effectively with the computer may be more acute. The ability to tailor the output to the user's individual needs enables the interface to be streamlined, with a minimum of wasted time and effort. For example, long descriptions of a form field may be quickly read by a sighted person, but may incur a long delay if read by a voice synthesizer or Braille reader. Accordingly, the end user may wish to have an abbreviated description so as to navigate quickly among all the options available.

What is needed is a system that enables users of screen readers to associate descriptive information with elements such as navigational items and form fields on electronic documents.

SUMMARY OF INVENTION

This invention pertains to a screen reader feature that enables end users to assign their own descriptions to forms and navigational elements in electronic documents such as web pages, word processing documents and portable document formats. The form or navigational element is identified by the end user. A dialog box provides a text entry box for accepting a user-defined description. The description is saved in association with the document and its particular form or navigational element.

Also provided is method for assigning user-defined descriptions to an element in a computer-rendered document in a computer having a screen reader. The method includes the steps of focusing on an element in the computer-rendered document, whereby focusing identifies the element to be described, invoking a labeler function in the screen reader, assigning a user-defined description to the element and saving the description in association with the computer-rendered document. The assigned user-defined description is associated with the underlying code for the element. The elements in the computer rendered document can be text links, graphic links, form fields and buttons. Additionally, the element can be a form input element or navigational element. Often these graphic elements are bit-mapped elements that are not easily interpreted by the screen reader. The computer-rendered document can be a web page, a word processing document or a portable document formats (pdf) document. Also taught are a method for assigning user-defined descriptions to a navigational element or a form input element in a web page in a computer having a screen reader.

BRIEF DESCRIPTION OF THE DRAWINGS

For a fuller understanding of the nature and objects of the invention, reference should be made to the following detailed description, taken in connection with the accompanying drawings, in which:

FIG. 4 is another illustration of the box depicted in FIG. 3.

DETAILED DESCRIPTION OF THE PREFERRED EMBODIMENT

A screen reader feature is described that enables end users to assign their own descriptions to forms and navigational elements in electronic documents such as web pages, word processing documents and portable document formats. The form or navigational element is identified by the end user. A dialog box provides a text entry box for accepting a user-defined description. The description is saved in association with the document and its particular form or navigational element.

Figure 1:
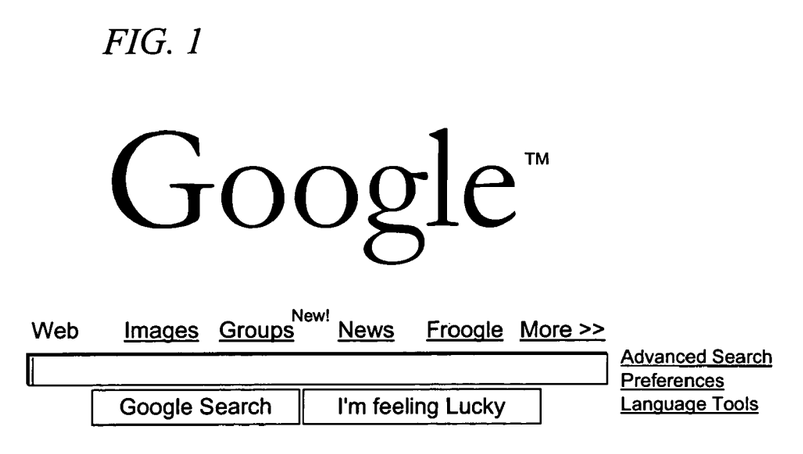
FIG. 1 is an illustration depicting a webpage for Google™. The web page contains one edit and two button controls. Note that the edit control has no prompt.

Referring to FIG. 1 there is shown a web page for Google™. Such web pages may use graphics to navigate to other pages. While a sighted user might be able to easily interpret the bitmapped image, a screen reader cannot. If the graphic element does not have an appropriate text description, the user may add his or her own. This description may be associated with the raw HTML code that provides for the hyperlink so that any other hyperlink on the page, whether graphic or text automatically abides by the user's own description.

In similar fashion, a form element such as a search box may be redefined by the user. Referring again to FIG. 1 there is shown a web page. The webpage contains one edit and two button controls. Note that the edit control has no prompt. The absence of a prompt can lead to confusion for users of screen reader. The screen reader examines the underlying code to associate the user description with the particular form. Using this method, the hyperlinks, forms and other document elements can be modified by the editor or author of the document, but the user's descriptions will stay intact.

An embodiment anticipated by the present inventors provides for a structured INI-file format saved with a "JSI" extension. The naming convention of the actual JSI file is the domain name of the website. When a website is brought up by the user, the screen reader enumerates through the JSI files to see if any user-defined elements exist and applies them as appropriate.

Another embodiment of the invention includes the sharing of the JSI files, or equivalent means, by multiple users. Thus, if descriptions to forms and navigational elements are enumerated by a first user, then sharing of this information with additional users permits them to take advantage of the first user's descriptions. It should be noted that the JSI files can be structured XML, comma delimited, stored in a SQL-based database or any other means known to those skilled in the art. The user defined descriptions may also be stored on a remote store and retrieved by real-time query as required such as a SOAP request through a web-service.

A JAWS screen reader has been developed that allows users to assign custom text labels to almost any HTML element that a user can move to by pressing the TAB key. These elements include text links, graphic links, form fields, and buttons. You can also label images on Web pages. After assigning the user-defined descriptions, JAWS reads these custom labels instead of the identifying text assigned to the elements by the web page author. JAWS also uses custom labels to identify elements when they appear in lists, such as the list of form fields that displays when you press INSERT+F5.

With this feature, a user can customize the elements of any web page to help navigate the page, reduce verbosity, compensate for incomplete or poorly labeled elements, and similar functions. A user can also redefine the labels for entire web forms or applications resulting in names that are more useful and meaningful. It is also possible to customize web pages so that links and graphics provide more information and help users find needed information more quickly.

The invention will be further described by way of the following non-limiting examples. The following examples demonstrate how a user employing the custom labels functions can make web pages easier to use and more informative.

Example 1

Labeling an Edit Control

A user would open a web page such as the Google™ web page shown in FIG. 1. The web page contains one edit and two button controls. The edit control has no prompt. The absence of a prompt can be confusing to the user of a screen reader.

Figure 2:
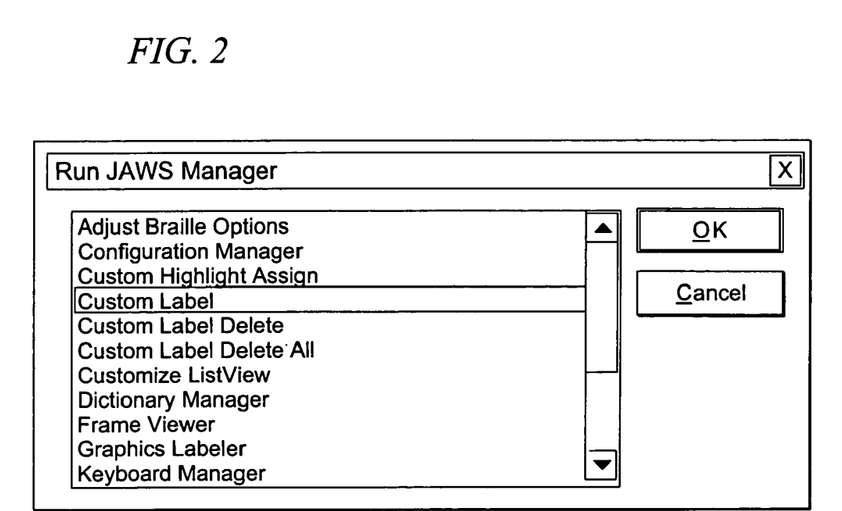
FIG. 2 is an illustration depicting a dialog box for JAWS Manager. While focus is located on the edit control, pressing the INSERT+F2 JAWS command generates the dialog box where you call the custom labeler function.

While focus is located on the edit control, a user would press the INSERT+F2 JAWS command to generate the dialog box shown in FIG. 2. From the dialog box a user can select the custom labeler function.

Figure 3:
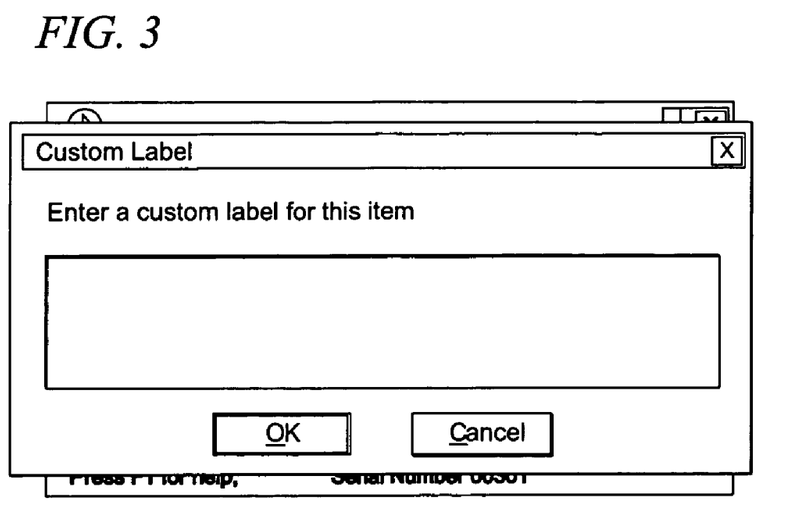
FIG. 3 is an illustration depicting the custom label box where a user would type a description to be associated with an element.
Figure 4:
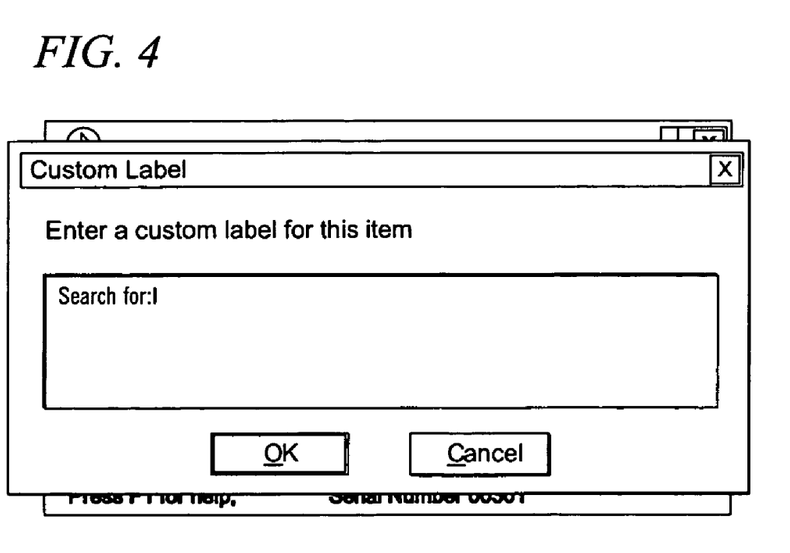
FIG. 4 illustrates the entry of the text "Search for:" in the box. This entry will result in a screen reader outputting, by speech synthesizer or in other format, the afoerementioned text.

Once the custom labeler function is selected, a dialog box appears as shown in FIG. 3. A user can then enter the text to be output by the screen reader associated with that particular element when that element is displayed in the future. FIG. 4 shows an example whereby a user types the text "search for:". As a result of this entry, when a user lands on the Google™ edit control in the future, the screen reader will speak or otherwise display, "search for" to queue the user as to the function of the edit control.

Figure 5:
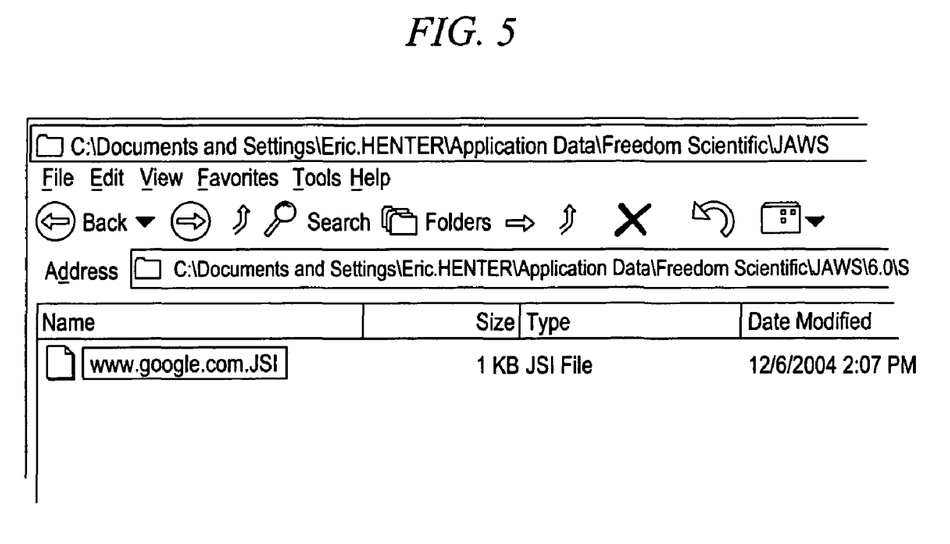
FIG. 5 is an illustration depicting the file name and path where a user can store the information in the user's settings.
Figure 6:
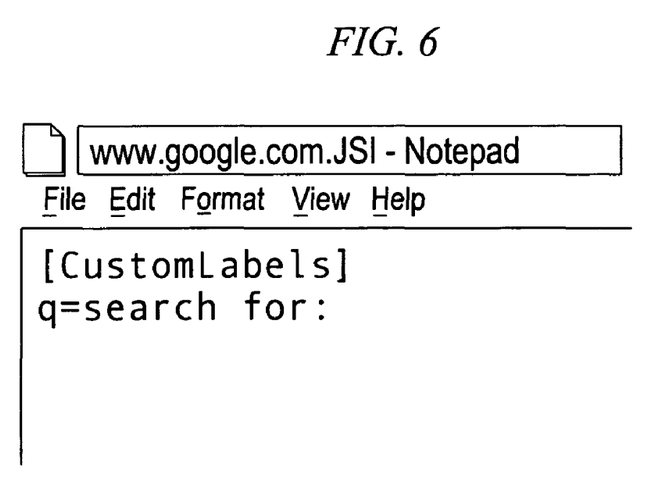
FIG. 6 is an illustration depicting the contents of the www-.google.com.jsi file that is created for that domain in the future.

The user settings can then be stored by pressing enter or "OK" as shown in FIG. 4. FIG. 5 shows the file name and path where the settings can be stored. FIG. 6 shows the contents of the www.google.com.jsi file that is created for that domain name in the future.

Figure 7:
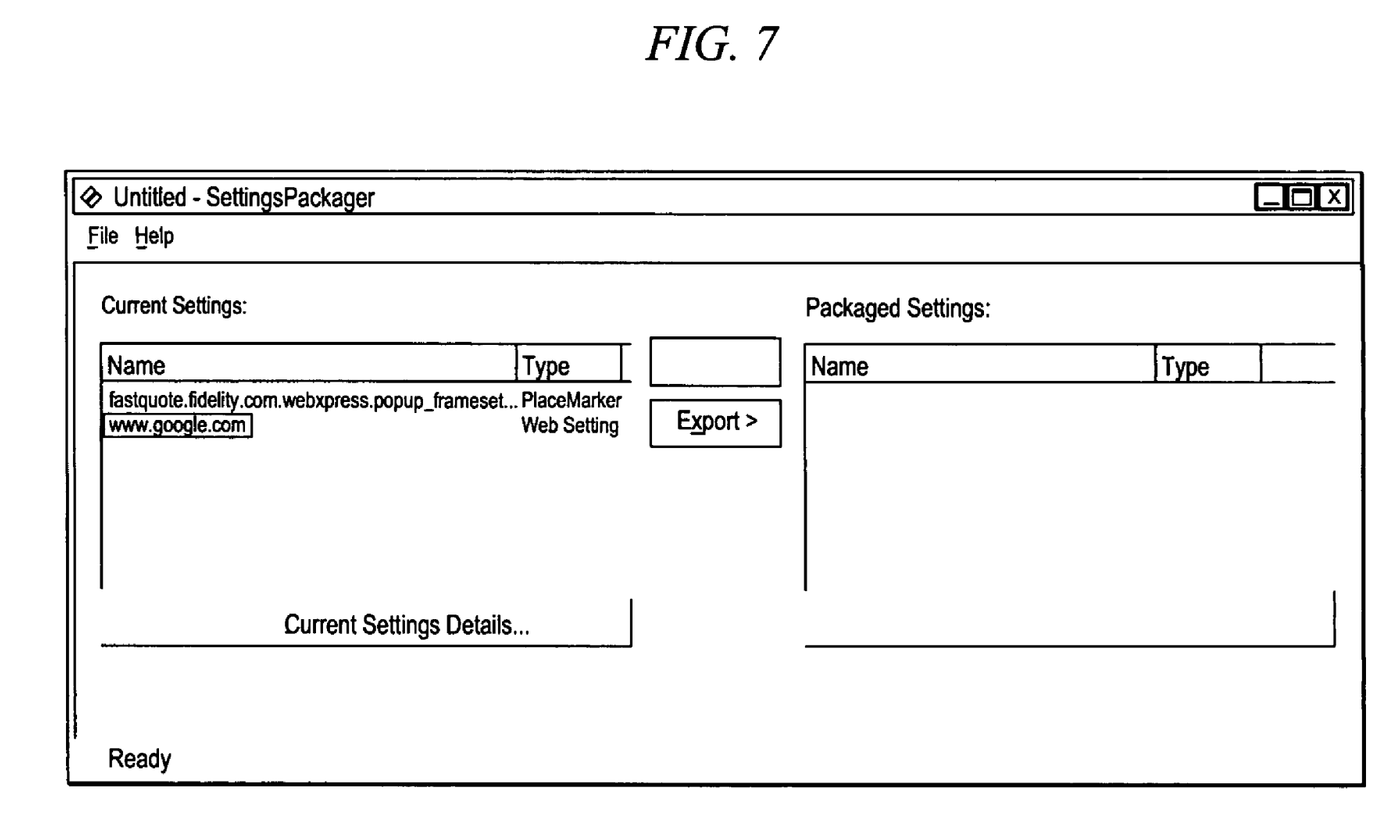
FIG. 7 is an illustration depicting a JAWS utility that is used to package the custom labels and PlaceMarker files so they can be exported or imported on other machines for use.

The settings can then be shared with other users. FIG. 7 shows a JAWS utility that is used to package the custom labels and PlaceMarker files so they can be exported or imported on other machines for use.

Example 2

Labeling an Image Map

Figure 8:
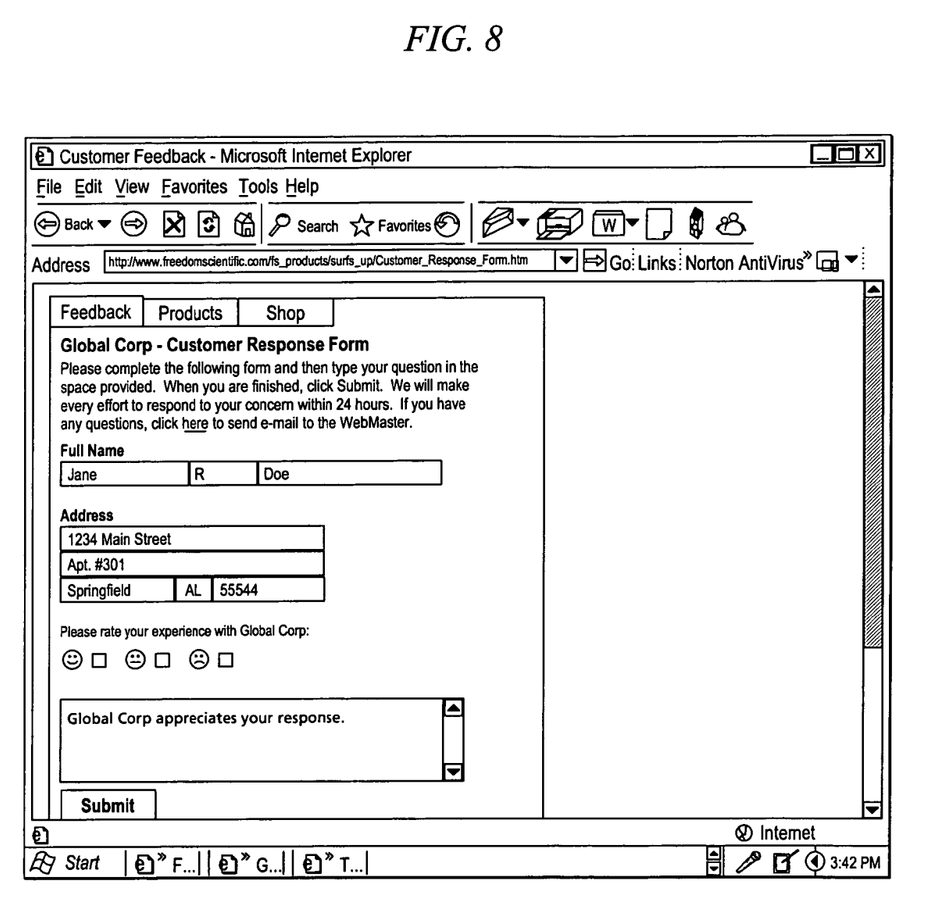
FIG. 8 is an illustration depicting a hypothetical web page for a customer response form. Note that the form includes tabs near the top, numerous form input fields beneath the tabs, buttons on the lower portion of the form and graphics, as represented by the smiley faces, next to the buttons.

FIG. 8 shows a hypothetical customer response form. The image at the very top of the customer response form depicts three tabs that users can click to navigate to other sections of the site. The three tabs are labeled "Feedback", "Products" and "Shop". When JAWS reads this image, it says, "Graphic navigation tabs." This graphic is a special type called an image map. Image maps have one or more areas on them that act like links. Mouse users can click these areas, and JAWS users can press ENTER to activate these links.

The image map on the sample customer response form is not coded to work well with JAWS. Below is an example of how a user running JAWS screen reader can use a custom label function to make the image map easier to use:

A user would open a web page such as the web page Open the Customer Response Form sample Web page as shown in FIG. 8.

Press CTRL+INSERT+G, select "Navigation tabs," and press ENTER to move to the navigation tab image.

Press DOWN ARROW to read the first image map link. The information provided by the page author is not very helpful in determining what this link actually does.

Press ENTER to activate the link. The message that displays tells a user what this link does. On a real web page, the link would take the user to another page without displaying the message. The user would have to explore the site more thoroughly to discover what the link actually does.

Press INSERT+F2. Select "Custom Label" and press ENTER to assign a custom label to this image map link.

Since this link takes the user to the Products page, type "Products" and press ENTER.

Press DOWN ARROW to read the next image map link. This link also doesn't have a good description. Press ENTER to find out what this link does.

Press CTRL+INSERT+TAB. This keystroke is a shortcut a user can employ to label an HTML element.

Since this image map link takes the user to the Shopping page, type "Shop," and press ENTER.

Press CTRL+HOME and then begin reading the page again. Notice that JAWS now reads the labels assigned to the image map links instead of "tab2" and "tab3."

Example 3

Labeling a Text Link

Often times, the actual text of a link will not be very descriptive. A user running JAWS can use custom labels to change the text of a link. Use this feature to shorten wordy links or add more description to short links. An example of how a user running JAWS can label text links is provided below:

Open a web page. See for instance the Customer Response Form sample web page shown in FIG. 8. On the upper third of the page there is a four line paragraph ending with the phrase "click here to send e-mail to the WebMaster." The underlined word "here" functions as a text link.

Press INSERT+F7 to display a list of links on the page. Find the link named "Here." That name isn't very descriptive. Select the link "Here" and choose Move to Link to go to the link's location on the page to find out more about it.

Press ALT+NUM PAD 5 to read the sentence this link appears in. From the context of the sentence, a user can determine that the link allows the user to send e-mail to the WebMaster.

Press CTRL+INSERT+TAB to label this link.

Type "Send WebMaster E-mail" and press ENTER.

Press ALT+NUM PAD 5 to read the sentence again. Notice that JAWS reads the recently assigned label instead of the word "here."

Press INSERT+F7 again. The entry "Here" that was previously in the list has been replaced by "Send WebMaster E-mail." Any time a user assigns a custom label, JAWS displays that label when the element appears in HTML lists.

Example 4

Labeling Form Fields

A user can also assign custom labels to form fields and controls, such as edit boxes, radio buttons, combo boxes, check boxes, and buttons. Presented below is an example of assigning labels to some unlabeled fields.

Open a web page. See for instance the Customer Response Form sample web page shown in FIG. 8.

Press F to move to the first form field on the page. This form is poorly designed. Most of the fields are labeled incorrectly or aren't labeled at all. Press INSERT+F5 to display a list of form fields. A user would see that the majority of fields in this list are unlabeled. Fortunately, the web page author has entered some initial text in the fields. This text can be used to figure out the field's purpose.

Press E twice to move through the first three edit boxes on the page. JAWS announces the contents and label for each field. Though each edit box may seem to be nondescript, each has different initial text that will help a user determine their function.

From the initial text present in each edit box, a user can deduce that he is supposed to type his first name, middle initial, and last name in the first, second, and third edit boxes respectively. Press SHIFT+E twice to return to the first edit box, then press CTRL+INSERT+TAB.

Type "First Name" and press ENTER to label this field. Assign meaningful labels to the other two edit boxes using the Custom Label command (CTRL+INSERT+TAB).

Press E until hearing "Address." Press the TAB key four times and listen to JAWS announce each address-related field. Determine the purpose of each field and then assign each a meaningful custom label.

Figure 9:
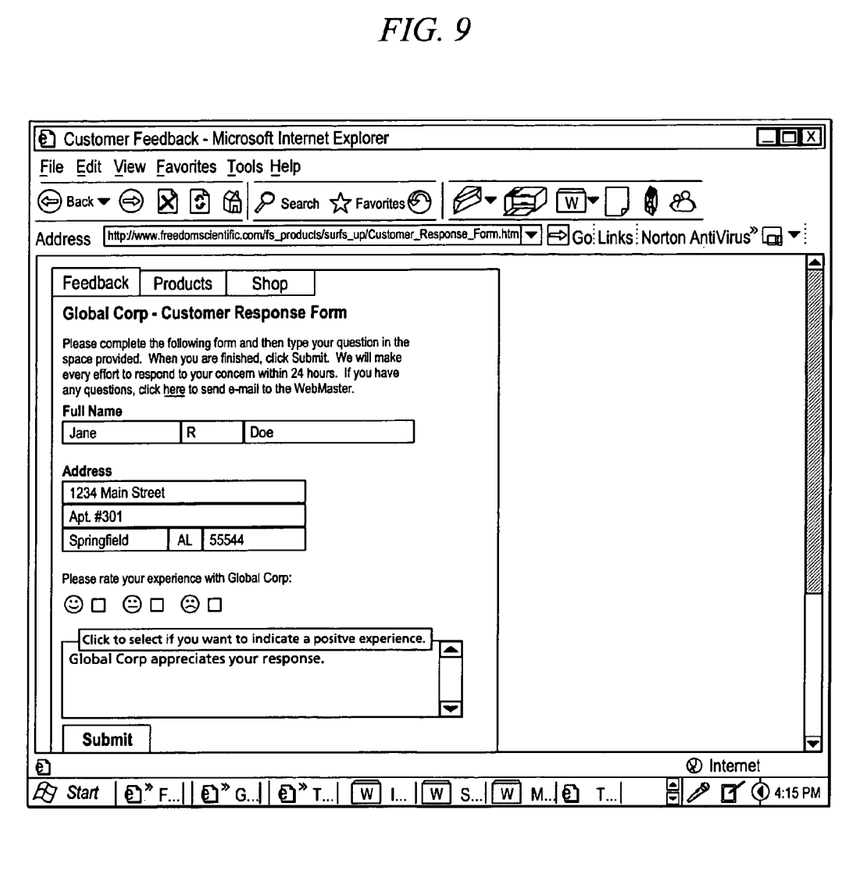
FIG. 9 is another illustration of the web page depicted in FIG. 8. Note the appearance of the text "Click to select if you want to indicate a positive experience." immediately below the smiley faces.

When finished, press X. This command moves the user to the first of three check boxes used to indicate the level of customer satisfaction. Each check box is labeled with an image (a happy face, an indifferent face, and an angry face). Though the descriptions the user hears for the check boxes are long, they are accurate and coded correctly. These particular descriptions come from the images' ALT text. In this case, the web author primarily intended to use this ALT text to provide further information to sighted users when they move the mouse pointer over the image. For example, moving the pointer over the happy face displays the text "Click to select if you want to indicate a positive experience". (See for instance FIG. 9)

Use custom labels to shorten these verbose labels. Press INSERT+CTRL+TAB, type "Good," and press ENTER.

Press X to move to the next check box and give it the label "Fair." Then press X again and label the last check box "Bad."

Press E to move to an unlabeled multiline edit box. From the introductory paragraph and the initial text, the user can deduce that this area is where he enters comments. Press INSERT+CTRL+TAB, type "Comments," and press ENTER.

Press INSERT+F5 to review all of the form fields on this page. JAWS displays all the fields using the custom labels assigned to them. This form should be much easier to fill out now.

Example 5

Labeling Graphics

In the previous example, a series of three check boxes that used an image as their original label were modified. Custom labels were assigned to the check boxes, but not the images. A user can also can label images like these, and any other images with poor, incorrect, or missing ALT text, using the Custom Label feature.

Open a web page. See for instance the Customer Response Form sample web page shown in FIG. 8.

Press CTRL+INSERT+G to display a list of graphics on the page.

Select "Click to select if you want to indicate a positive experience" and press ENTER to move to the image.

Press CTRL+INSERT+TAB, type, "Good rating," and press ENTER.

Press G to move to the next graphic. Label this image "Fair rating."

Press G again to move to the last graphic and label it "Bad rating."

Press CTRL+INSERT+G to display a list of graphics again. Notice that the lengthy descriptions taken from the images' ALT text have been replaced with the custom labels as entered immediately above.

Example 6

Sharing Custom Labels

After assigning custom labels to a page, those labels can be shared with other users. Custom labels can be saved in .jsi files, analogous to other personalized web settings. A settings packager function can be used to export labels to other JAWS users or import another user's custom labels. For more information, see Settings Packager function of JAWS.

Example 7

Deleting Custom Labels

Specific custom labels can be deleted at any time. Additionally, a user can delete all custom labels on a page. To delete an element's label, move to it with standard JAWS reading commands, the TAB key, a Navigation Quick Key, or a JAWS HTML list. Then, press INSERT+F2, select "Custom Label Delete," and press ENTER. JAWS will now read the original identifying text instead of the custom label.

To delete all custom labels on the current page, press INSERT+F2, select "Custom Label Delete All," and press ENTER.

What is claimed is:

1. A method for assigning a user-defined label to a control element in a computer-rendered document in a computer having a screen reader comprising the steps of:
   providing a computer having a screen reader function;
   focusing on the control element in the computer-rendered document, whereby focusing identifies the control element to be described by output through the screen reader;
   invoking a labeler function in the screen reader;
   assigning the user-defined label to the control element, wherein the user-defined label is associated with the underlying code for the control element; and
   saving the user-defined label in association with the computer-rendered document whereby upon the control element subsequently entering focus, the user-defined label is output to the screen reader.

2. The method of claim 1 wherein the control element is selected from the group consisting of text links, graphic links, form fields and buttons.

3. The method of claim 1 wherein the control element is a form input element.

4. The method of claim 1 wherein the control element is a navigational element.

5. The method of claim 1 wherein the computer-rendered document is selected from the group consisting of web pages, word processing documents and portable document formats.

6. The method of claim 4 wherein the navigational element is a graphic element, whereby the element is a bit-mapped control element that is not easily interpreted by the screen reader.

7. A method for assigning a user-defined label to a navigational control element in a web page in a computer having a screen reader, the method comprising the steps of:
   providing a computer having a screen reader function;
   focusing on the navigational control element in the webpage, whereby focusing identifies the navigational control element to be described;
   invoking a labeler function in the screen reader;
   assigning the user-defined description to the navigational control element, wherein the user-defined label is associated with the underlying code for the navigational control element; and
   saving the user-defined label in association with the web page whereby upon the navigational control element subsequently entering focus, the user-defined label is output to the screen reader.

8. A method for assigning a user-defined label to a form input element in a web page in a computer having a screen reader, the method comprising the steps of:
   providing a computer having a screen reader function;
   focusing on the form input element in the webpage, whereby focusing identifies the form input element to be labeled;
   invoking a labeler function in the screen reader;
   assigning a user-defined label to the form input element, wherein the user-defined label is associated with the underlying code for the form input; and
   saving the user-defined label in association with the web page whereby upon the form input element subsequently entering focus on the web page, the user-defined label is output to the screen reader.

9. A method for assigning a user-defined label to a control element in a computer-rendered document in a computer having a screen reader comprising the steps of:
  providing a computer having a screen reader function;
  focusing on the control element in the computer-rendered document, whereby focusing identifies the control element to be described by output through the screen reader;
  invoking a labeler function in the screen reader;
  assigning the user-defined label to the control element, wherein the user-defined label is associated with the underlying code for the control element;
  saving the user-defined label in association with the computer-rendered document whereby upon the control element subsequently entering focus, the user-defined label is output to the screen reader; and
  sharing the user-defined label with additional users whereby the sharing permits
  the additional users to apply the user-defined labels.

10. The method of claim 9 wherein the user-defined label is saved to a medium selected from the group consisting of INI-files, structured XML files, comma delimited files, and a database.

11. The method of claim 9 wherein the user-defined label is stored on a remote store and retrieved by a real-time query.

12. The method of claim 11 wherein the real-time query comprises a SOAP request through a web-service.

13. A computer-readable medium having stored thereon a program which is executable by a processor, the program comprising instructions for:
  focusing on a control element in a computer-rendered document, whereby focusing identifies the control element to be described by output through a screen reader;
  invoking a labeler function in the screen reader;
  assigning a user-defined label to the control element, wherein the user-defined label is associated with the underlying code for the control element; and
  saving the user-defined label in association with the computer-rendered document whereby upon the control element subsequently entering focus, the user-defined label is output to the screen reader.

14. The computer-readable medium of claim 13 wherein the control element is selected from a group consisting of text links, graphic links, form fields and buttons.

15. The computer-readable medium of claim 13 wherein the control element is a form input element.

16. The computer-readable medium of claim 13 wherein the control element is a navigational element.

17. The computer-readable medium of claim 13 wherein the computer-rendered document is selected from the group consisting of web pages, word processing documents and portable document formats.

18. The computer-readable medium of claim 13 wherein the step of invoking a labeler function in the screen reader further comprises displaying a dialog box having a text entry box for accepting the user-defined label.

19. The computer-readable medium of claim 13 further comprising instructions for sharing the user-defined label with additional users whereby the sharing permits the additional users to apply the user-defined labels.

20. The computer-readable medium of claim 16 wherein the navigational element is a graphic element, whereby the graphic element is a bit-mapped control element that is not easily interpreted by the screen reader.

21. The computer-readable medium of claim 19 wherein the user-defined label is stored on a remote store and retrieved by real-time query as required.

22. The computer-readable medium of claim 21 wherein the real-time query comprises a SOAP request through a web-service.

23. A method for assigning a user-defined label to a control element in a computer-rendered document in a computer having a screen reader comprising the steps of:
  focusing on the control element in the computer-rendered document, whereby focusing identifies the control element to be described by output through the screen reader;
  invoking a labeler function in the screen reader;
  assigning the user-defined label to the control element, wherein the user-defined label is associated with the underlying code for the control element;
  saving the user-defined label in association with the computer-rendered document whereby upon the control element subsequently entering focus, the user-defined label is output to the screen reader; and
  generating a list of form fields in the computer-rendered document responsive to a user request, the form fields displayed with the user-defined label for each form field.

24. A computer-readable medium having stored thereon a program which is executable by a processor, the program comprising instructions for:
  focusing on a control element in a computer-rendered document, whereby focusing identifies the control element to be described by output through a screen reader;
  invoking a labeler function in the screen reader;
  assigning a user-defined label to the control element, wherein the user-defined label is associated with the underlying code for the control element;
  saving the user-defined label in association with the computer-rendered document whereby upon the control element subsequently entering focus, the user-defined label is output to the screen reader; and
  generating a list of form fields in the computer-rendered document responsive to a user request, the form fields displayed with the user-defined label for each form field.

* * * * *